(12) United States Patent
Teyeb et al.

(10) Patent No.: US 9,301,234 B2
(45) Date of Patent: Mar. 29, 2016

(54) HANDOVER CONTROL FOR NETWORKS WITH SEVERAL TYPES OF BACKHAUL CONNECTIONS

(75) Inventors: Oumer Teyeb, Solna (SE); Bernhard Raaf, Neuried (DE); Simone Redana, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 165 days.

(21) Appl. No.: 13/883,030

(22) PCT Filed: Nov. 4, 2010

(86) PCT No.: PCT/EP2010/066825
§ 371 (c)(1),
(2), (4) Date: May 21, 2013

(87) PCT Pub. No.: WO2012/059131
PCT Pub. Date: May 10, 2012

(65) Prior Publication Data
US 2013/0229939 A1  Sep. 5, 2013

(51) Int. Cl.
*H04L 12/26* (2006.01)
*H04W 36/30* (2009.01)
*H04W 36/08* (2009.01)

(52) U.S. Cl.
CPC ............. *H04W 36/30* (2013.01); *H04W 36/08* (2013.01)

(58) Field of Classification Search
None
See application file for complete search history.

(56) References Cited

U.S. PATENT DOCUMENTS

| | | | |
|---|---|---|---|
| 8,369,353 B1 * | 2/2013 | Habib et al. | 370/464 |
| 2004/0266434 A1 | 12/2004 | Lehtinen et al. | 455/436 |
| 2012/0076016 A1 * | 3/2012 | Robbins et al. | 370/252 |

FOREIGN PATENT DOCUMENTS

| | | |
|---|---|---|
| EP | 2 117 170 A1 | 11/2009 |
| EP | 2 197 236 A1 | 6/2010 |
| WO | WO 2010/123279 A2 | 10/2010 |

* cited by examiner

*Primary Examiner* — Afshawn Towfighi
(74) *Attorney, Agent, or Firm* — Harrington & Smith

(57) ABSTRACT

There are provided measures for handover control for backhaul connections, said measures exemplarily including evaluation of the suitability of an access node cell in access network as target for a handover of a terminal based on delay information being indicative of an expected packet delay in a cell of the access node, wherein such delay information may be generated and/or exchanged in the access network. Said measures may exemplarily be applied for improving handover control in relay-enhanced access networks or networks that contain access nodes connected via different kinds of backhaul that can result in different end-to-end packet delays.

18 Claims, 6 Drawing Sheets

HANDOVER CONTROL FOR NETWORKS WITH SEVERAL TYPES OF BACKHAUL CONNECTIONS

FIELD OF THE INVENTION

The present invention relates to handover control in networks with several types of backhaul connections.

BACKGROUND OF THE INVENTION

In the development of radio communication systems, such as mobile communication systems (like for example GSM (Global System for Mobile Communication), GPRS (General Packet Radio Service), UMTS (Universal Mobile Telecommunication System) or the like), efforts are made for an evolution of the radio access part thereof. In this regard, the evolution of radio access networks (like for example the GSM EDGE radio access network (GERAN) and the Universal Terrestrial Radio Access Network (UTRAN) or the like) is currently addressed. Such improved radio access networks are sometimes denoted as evolved radio access networks (like for example the Evolved Universal Terrestrial Radio Access Network (E-UTRAN)) or as being part of a long-term evolution (LTE) or LTE-Advanced. Although such denominations primarily stem from 3GPP (Third Generation Partnership Project) terminology, the usage thereof hereinafter does not limit the respective description to 3GPP technology, but generally refers to any kind of radio access evolution irrespective of the underlying system architecture. Another example for an applicable broadband access system may for example be IEEE 802.16 also known as WiMAX (Worldwide Interoperability for Microwave Access).

In the following, for the sake of intelligibility, LTE (Long-Term Evolution according to 3GPP terminology) or LTE-Advanced is taken as a non-limiting example for a broadband radio access network being applicable in the context of the present invention and its embodiments. However, it is to be noted that any kind of radio access network may likewise be applicable, as long as it exhibits comparable features and characteristics as described hereinafter.

In the development of cellular systems in general, and access networks in particular, relaying has been proposed as one concept. In relaying, a terminal or user equipment (UE) is not directly connected with an access node such as a radio base station (e.g. denoted as eNodeB or eNB) of a radio access network (RAN), but via a relay node (RN). Relaying by way of relay nodes has been proposed as a concept for coverage extension in cellular systems. Apart from this main goal of coverage extension, introducing relay concepts can also help in providing high-bit-rate coverage in high shadowing environments, reducing the average radio-transmission power at the a user equipment (thereby leading to long battery life), enhancing cell capacity and effective throughput, (e.g. increasing cell-edge capacity and balancing cell load), and enhancing overall performance and deployment cost of radio access networks.

FIG. 1 shows a schematic diagram of a typical deployment scenario of a relay-enhanced access network, such as e.g. a LTE or LTE-Advanced RAN with radio-relayed extensions. As shown in FIG. 1, UEs at disadvantaged positions such as a cell edge and/or high shadowing areas are connected to a so-called donor base station (DeNB) via a respective relay node RN. Generally, any one of the relay nodes may be stationary/fixed or mobile. The link between the DeNB and RN may be referred to as backhaul link/connection (while, generally, a backhaul link/connection may be regarded to be any link between a base station and a node towards a core network side, e.g. a link between a micro/macro/pico/femto home base station and the core network), relay link or Un link, and the link between RN and UE may be referred to as access link or Uu link.

As, in the deployment scenario according to FIG. 1, a link between the DeNB and a core network (not shown) may also be referred to as a backhaul link/connection, such relay-enhanced cellular system may be said to contain several types of backhaul connections.

Recently, the concept of relaying is adopted in the context of LTE-Advanced.

In the context of LTE-Advanced, a Layer 3 (L3) RN, also referred to as Type I RN or self-backhauling RN, is currently taken as a baseline case for the study on relay extensions. Such a relay node, which is exemplarily assumed for the further description, appears as a normal base station towards its served terminals or user equipments (UE). That is, such relay node is required to have all the essential release 8 eNB cell parameters and to broadcast them so that it could be recognized as a normal eNB cell by the UEs.

Accordingly, both the DeNB as well as the RNs may be regarded as base stations of an access network, possibly as base stations of different hierarchical level in terms of logical and/or structural network deployment.

However, the concept of relaying, i.e. the introduction of relay nodes, also leads to several problems. In the present description, the resulting increase of end-to-end delay in relay-enhanced connections is particularly considered.

Such increase of the end-to-end delay is basically due to the fact that data has to be forwarded between DeNBs and RNs, increasing the delay as compared with a scenario of macro eNBs (such as DeNBs) only. The extra delay is even more severe than it looks from a mere counting of the additional hops. This is because these hops will not necessarily be performed sequentially in a time-wise manner without some interruption, which is due to the usage of the Multicast Broadcast Single Frequency Network (MBSFN) frame structure for the communication between RN and DeNB. This is because LTE UEs (e.g. LTE release 8 UEs) are expected to monitor the Physical Downlink Control Channel (PDCCH) for Reference Signals (RSs) all the time, unless they are under Discontinuous Reception (DRX) sleep mode, and as such it is not feasible to switch off the link between the RN and its UEs when the RN-DeNB link is active. In the MBSFN solution, the Orthogonal Frequency Division Multiplexing (OFDM) symbols that are specified (e.g. in LTE release 8) for MBSFN are used to switch the RN into reception mode from the DeNB, while the UEs (e.g. LTE release 8 UEs) will assume that this is some MBSFN transmission with low power and, thus, will not make any use of the signals transmitted there.

A further increase of the end-to-end delay is caused by handovers in a relay-enhanced access network, in particular handovers of UEs between two relay nodes controlled by different DeNBs.

FIG. 2 shows a schematic diagram of a handover scenario in a deployment scenario of a relay-enhanced access network with radio-relayed extensions. As shown in FIG. 2, a user equipment UE is connected to its serving base station denoted as source donor base station (DeNB) via a relay node denoted as source relay node (RN). When a handover of the UE to another cell is performed, as indicated by the dashed arrow in FIG. 2, the user equipment will then be connected to its new serving base station denoted as target donor base station (DeNB) via a new relay node denoted as target relay node (RN). The individual connections being indicated by double-sided double-line arrows may be any kind of physical and/or logical connection, including for example X2 interface connections between relay nodes and base stations or between base stations.

FIG. 3 shows a signalling diagram of a handover preparation procedure, in particular an admission control for handover preparation, in the handover scenario according to FIG. 2.

In such a case, assuming that, for example, 1/10th of the sub-frames are allocated for the backhaul link between RN and DeNB, the additional (relaying-caused) handover request and handover request ACK messages between the target RN and DeNB may lead to at least 10 ms and up to 20 ms of additional delay in the handover process. It might also be required to have a resource reconfiguration in the backhaul link during the backhaul admission control process, when there are resource limitations. That is, the DeNB may reconfigure the resource partitioning so that more sub-frames are allocated for the backhaul or the access links. This process will also cause additional delay in the handover process, as the UE is required to wait while the resource re-partitioning is being performed.

Any delay, in particular additional end-to-end delay due to relaying, is particularly adverse for delay-sensitive bearers. Namely, real-time and/or delay-sensitive active bearers of a UE subject to a handover process may thus experience severe quality degradation.

Moreover, the end-to-end delay is even further increased in a multi-hopping case in which multiple RNs being controlled by the same DeNB may be connected to each other in a chain-like manner so that multiple hops may be needed from a RN to its DeNB. That is, in such scenario, the UE data has to pass via several RNs before it reaches the UE (in case of downlink) or the DeNB (in case of uplink), respectively. The multi-hopping nature of such relaying scenarios increases the overall end-to-end delay of packets, and as such it might not be appropriate for certain bearers or services, in particular real-time and/or delay-sensitive active bearers or services.

Another concept in the context of LTE and LTE-Advanced is the concept of Home NodeBs (HNBs) and Home eNodeBs (HeNBs), also known as femto cells.

The specification work for Home NodeB (HNBs) and Home eNodeB (HeNBs), also known as femto cells, is applicable for LTE release 8 and beyond. A HNB or HeNB is basically a small base station that uses an alternative backhaul connection to the mobile core network (which in case of HNB may be a direct link to the core network, and in case of HeNB may be a link via a HeNB gateway towards the core network), such as the subscriber's fixed DSL (digital subscriber line) internet connection, instead of the usual microwave or high capacity leased or fibre optics lines that usually connect base stations to the core network. This is especially advantageous in many aspects such as better indoor coverage and load balancing where the subscribers inside a given household or office building will be served via the HNB, thereby freeing the macro cells for other users.

In such femto cell environment, a link between the HNB/HeNB and the core network may be said to be a backhaul connection of different type as compared with a link between a normal/macro base station and the core network.

However, the end-to-end delay in a HNB/HeNB case may end up being higher and more unpredictable than in a normal macro/micro/pico base station case, because part of the path is through the Internet, or another operator's DSL network, where the operator might have no control over, and the available bandwidth therein may have to be shared with the traffic from multiple users, becoming liable to congestion. Thus, as in the relaying case discussed above, HNBs/HeNBs might not be appropriate for serving certain bearers or services, in particular real-time and/or delay-sensitive active bearers or services.

That is to say, similar problems and drawbacks may prevail both in a relay cell environment as well as a femto cell environment.

In view thereof, there exist various problems in the context of handover processes in access networks comprising several types of backhaul connections between base stations, such as especially in relay-enhanced access networks or access networks with femto cells. Especially when UEs are intended to be handed over (from a DeNB or RN) to a RN or (from a macro/micro/pico home base station or a HNB/HeNB) to a HNB/HeNB, conventional handover processes on the basis of measurement reports of the UE may be insufficient or at least inefficient (e.g. in terms of delay conditions).

In order to prevent a UE from handing over to a specific cell, such as a relay cell or a femto cell, the eNB or DeNB or macro/micro/pico base station can ignore situations that would have normally led to a handover to the concerned cell (for example, if the measurement reports from the UE indicate that the signal strength of the concerned cell has been satisfying the handover criteria). This can be done, for example, by modifying the neighbour relation table (NRT) such that the "no HO" (HO: handover) flag is checked for the concerned cell, or by way of access class barring, where the concerned cell could be marked as "reserved" or "barred".

Yet, both above-mentioned approaches are cell-specific. That is, such ignoring of a handover demand would apply to all UEs in the entire cell being marked or barred accordingly. This is undesirable, since the situation may be different for different UEs with respect to the same cell.

In view thereof, it is noted that preventing handovers of UEs to a specific cell, such as a relay cell or a femto cell, may not be appropriate with any one of the above-outlined approaches. That is, the above-outlined approaches are not capable of properly addressing the foregoing problems in the context of handover processes in access networks with several types of backhaul connections, such as especially in relay-enhanced access networks or access networks with femto cells (e.g. in terms of delay conditions).

Accordingly, a UE-specific approach for ignoring handover situations is preferable. This can be accomplished, for example, by the eNB making a note that a certain UE should not be handed over to certain cell or cells (e.g. by way of a UE-specific NRT), or by the eNB instructing the UE to put certain cells in its "black list" and to not send measurement reports for such cells according to the Radio Resource Control (RRC) or Medium Access Control (MAC) specifications.

Currently, no such feasible mechanism exists for facilitating efficient handover control in networks with several types of backhaul connections, such as for example in relay-enhanced access networks or access networks with femto cells. Such problem generally exists for any backhaul connections in any kind of access network, wherein backhaul connections between donor base stations and relay nodes in relay-enhanced access networks may be referred to as a specific, yet non-limiting, example in this regard as well as, for example, (backhaul) connections between femto cells/home base stations and the core network in access networks that contain both macro and femto cells.

Accordingly, there is a demand for mechanisms for facilitating efficient handover control for backhaul connections.

SUMMARY OF EMBODIMENTS OF THE INVENTION

The present invention and its embodiments aim at solving or at least mitigating the above problems.

The present invention and its embodiments are made to provide for feasible mechanisms for facilitating efficient handover control for networks with several types of backhaul connections.

According to an exemplary first aspect of the present invention, there is provided a method comprising receiving delay information being indicative of an expected packet delay in a cell of an access node in an access network, and evaluating the suitability of the access node cell as target for a handover of a terminal based on the expected packet delay of the access node cell.

According to further developments or modifications thereof, one or more of the following applies:
- the method according further comprises obtaining delay requirement information being indicative of a tolerable packet delay for the terminal, wherein the evaluating is based on the expected packet delay of the access node cell and the tolerable packet delay for the terminal,
- the method according further comprises receiving handover measurement reporting information being indicative of a signal quality in the cell of the access node for the terminal, wherein the evaluating is based on the expected packet delay of the access node cell and the signal quality in the access node cell for the terminal,
- the evaluating is made using predetermined relative weights of any one of the parameters on which the evaluation is based,
- the evaluating is made pre-emptively irrespective of a handover demand of the terminal and/or on demand with respect to a handover demand of the terminal,
- the method according further comprises enabling or disabling the access node cell as target for a handover of the terminal based on the evaluated suitability thereof,
- the method according further comprises instructing the terminal to start or stop handover measurement and/or handover measurement reporting for the access node cell, when the access node cell is enabled or disabled, respectively,
- the method according further comprises deciding on a handover of the terminal to the access node cell, when the access node cell is enabled, based on the evaluated suitability thereof with respect to a suitability and/or existence of one or more other access node cells,
- the method further comprises determining the expected packet delay in the access node cell based on the received delay information,
- the delay information comprises one or more of measurement information of an actual packet delay in the access node cell, resource characteristic and/or resource usage information of the access node cell, mobility characteristic information of the access node cell, and multi-hopping characteristic information of the access node cell,
- the multi-hopping characteristic information of the access node cell may comprise cumulative delay information, including delay information of the access node cell and any access nodes between the access node of the cell and its controlling access node, and/or relay depth information, being indicative of a number of relay levels between the access node of the cell and its controlling access node, in case the access node of the cell is a relay node of a relay-enhanced access network,
- the method further comprises determining the tolerable packet delay for the terminal based on the received delay requirement information,
- the delay requirement information comprises one or more of a number of active bearers of the terminal, a type of the one or more active bearers of the terminal, and a delay characteristic of the one or more active bearers of the terminal,
- the method is operable at or by a donor base station controlling one or more relay nodes in a relay-enhanced access network, wherein said access node of said cell is a relay node, or the method is operable at or by a relay node in a relay-enhanced access network, wherein said access node is another relay node than said relay node,
- the method is operable at or by a macro base station, wherein said access node of said cell is a femto/home base station, or the method is operable at or by a femto/home base station, wherein said access node is another femto/home base station than said femto/home base station, and/or
- said access node and/or an apparatus performing the method is part of an evolved radio access network in accordance with LTE and/or LTE-Advanced specifications.

According to an exemplary second aspect of the present invention, there is provided a method comprising generating delay information being indicative of an expected packet delay in a cell of an access node in an access network, and transmitting the generated delay information towards an apparatus in charge of evaluating the suitability of the access node cell as target for a handover of a terminal.

According to further developments or modifications thereof, one or more of the following applies:
- the method according further comprises one or more of measuring an actual packet delay in the access node cell and including corresponding information in the delay information, obtaining a resource characteristic and/or a resource usage of the access node cell and including corresponding information in the delay information, obtaining a mobility characteristic of the access node cell and including corresponding information in the delay information, and obtaining a multi-hopping characteristic of the access node cell and including corresponding information in the delay information,
- obtaining the multi-hopping characteristic of the access node cell may comprise calculating a cumulative delay of the access node cell, including delay information of the access node and any access nodes between the access node of the cell and its controlling access node, and/or specifying a relay depth of the access node cell, being indicative of a number of relay levels between the access node of the cell and its controlling access node, in case the access node of the cell is a relay node of a relay-enhanced access network,
- the method according further comprises receiving a handover request for a handover of the terminal to the access node cell, and performing admission control for the handover of the terminal to the access node cell based on the expected packet delay of the access node cell, or delegating another access node to perform admission control for the handover of the terminal to the access node cell based on the expected packet delay of the access node cell on behalf of said access node,
- the method is operable at or by the access node,
- said access node is a relay node in a relay-enhanced access network,
- said apparatus in charge of evaluating the suitability is a donor base station controlling one or more relay nodes in a relay-enhanced access network, wherein said access node of said cell is a relay node, or said apparatus in charge of evaluating the suitability is operable at or by a relay node in a relay-enhanced access network, wherein said access node is another relay node than such relay node, said access node is a femto/home base station, said apparatus in charge of evaluating the suitability is a macro base station, wherein said access node of said cell is a femto/home base station, or said apparatus in charge of evaluating the suitability is operable at or by a femto/home base station, wherein said access node is another femto/home base station than such femto/home base station, and/or said access node and/or said apparatus in charge of evaluating the suitability and/or an apparatus performing the method is part of an evolved radio access network in accordance with LTE and/or LTE-Advanced specifications.

According to an exemplary third aspect of the present invention, there is provided an apparatus comprising a receiver configured to receive delay information being indicative of an expected packet delay in a cell of an access node in an access network, and a processor configured to evaluate the suitability of the access node cell as target for a handover of a terminal based on the expected packet delay of the access node cell.

According to further developments or modifications thereof, one or more of the following applies:

the processor is further configured to obtain delay requirement information being indicative of a tolerable packet delay for the terminal, and evaluate based on the expected packet delay of the access node cell and the tolerable packet delay for the terminal, the receiver is further configured to receive handover measurement reporting information being indicative of a signal quality in the access node cell for the terminal, and the processor is further configured to evaluate based on the expected packet delay of the access node cell and the signal quality in the access node cell for the terminal, the processor is further configured to evaluate using predetermined relative weights of any one of the parameters on which the evaluation is based, the processor is further configured to evaluate pre-emptively irrespective of a handover demand of the terminal and/or on demand with respect to a handover demand of the terminal, the processor is further configured to enable or disable the access node cell as target for a handover of the terminal based on the evaluated suitability thereof, the processor is further configured to instruct the terminal to start or stop handover measurement and/or handover measurement reporting for the access node cell, when the access node cell is enabled or disabled, respectively, and/or decide on a handover of the terminal to the access node cell, when the access node cell is enabled, based on the evaluated suitability thereof with respect to a suitability and/or existence of one or more other access node cells, the processor is further configured to determine the expected packet delay in the access node cell based on the received delay information, the delay information comprises one or more of measurement information of an actual packet delay in the access node cell, resource characteristic and/or resource usage information of the access node cell, mobility characteristic information of the access node cell, and multi-hopping characteristic information of the access node cell, the multi-hopping characteristic information of the access node cell may comprise cumulative delay information, including delay information of the access node cell and any access nodes between the access node of the cell and its controlling access node, and/or relay depth information, being indicative of a number of relay levels between the access node of the cell and its controlling access node, in case the access node of the cell is a relay node of a relay-enhanced access network, the processor is further configured to determine the tolerable packet delay for the terminal based on the received delay requirement information, the delay requirement information comprises one or more of a number of active bearers of the terminal, a type of the one or more active bearers of the terminal, and a delay characteristic of the one or more active bearers of the terminal, the apparatus is operable as or at a donor base station controlling one or more relay nodes in a relay-enhanced access network, wherein said access node of said cell is a relay node, or the apparatus is operable as or at a relay node in a relay-enhanced access network, wherein said access node is another relay node than said relay node, the apparatus is operable as or at a femto/home base station, the apparatus is operable as or at a macro base station, wherein said access node of said cell is a femto/home base stations, or the method is operable at or by a femto/home base stations, wherein said access node is another femto/home base stations than said femto/home base stations, and/or said access node and/or said apparatus is part of an evolved radio access network in accordance with LTE and/or LTE-Advanced specifications.

According to an exemplary fourth aspect of the present invention, there is provided an apparatus comprising a processor configured to generate delay information being indicative of an expected packet delay in a cell of a access node in an access network, and a transmitter configured to transmit the generated delay information towards an apparatus in charge of evaluating the suitability of the access node cell as target for a handover of a terminal.

According to further developments or modifications thereof, one or more of the following applies:

the processor is further configured to measure an actual packet delay in the access node cell and to include corresponding information in the delay information, the processor is further configured to obtain a resource characteristic and/or a resource usage of the access node cell and to include corresponding information in the delay information, the processor is further configured to obtain a mobility characteristic of the access node cell and to include corresponding information in the delay information, the processor is further configured to obtain a multi-hopping characteristic of the access node cell and to include corresponding information in the delay information, the processor, to obtain the multi-hopping characteristic of the access node cell, may be further configured to calculate a cumulative delay of the access node cell, including delay information of the access node and any access nodes between the access node of the cell and its controlling access node, and/or specify a relay depth of the access node, being indicative of a number of relay levels between the access node of the cell and its controlling access node, in case the access node of the cell is a relay node of a relay-enhanced access network, the apparatus further comprises a receiver configured to receive a handover request for a handover of the terminal to the access node cell, the processor is further configured to perform admission control for the handover of the terminal to the access node cell based on the expected packet delay of the access node cell, or to delegate another access node to perform admission control for the handover of the terminal to the access node cell based on the expected packet delay of the access node cell on behalf of said access node, the apparatus is operable as or at the access node, said access node is a relay node in a relay-enhanced access network, said apparatus in charge of evaluating the suitability of the access node is a donor base station controlling one or more relay nodes in a relay-enhanced access network, wherein said access node of said cell is a relay node, or the said apparatus in charge of evaluating the suitability of the access node is operable at or by a relay node in a relay-enhanced access network, wherein said access node is another relay node than such relay node, said access node is a femto/home base station, said apparatus in charge of evaluating the suitability of the access node is a macro base station, wherein said access node of said cell is a femto/home base station, or the said apparatus in charge of evaluating the suitability of the access node is operable at or by a femto/home base station, wherein said access node is another femto/home base station than such femto/home base station, and/or said access node and/or said apparatus in charge of evaluating the suitability of the access node and/or said apparatus is part of an evolved radio access network in accordance with LTE and/or LTE-Advanced specifications.

According to an exemplary fifth aspect of the present invention, there is provided a computer program product including a program comprising software code portions being arranged, when run on a processor of an apparatus (such as e.g. according to the above third aspect and/or developments or modifications thereof), to perform the method according to the above first aspect and/or developments or modifications thereof).

According to an exemplary sixth aspect of the present invention, there is provided a computer program product including a program comprising software code portions being arranged, when run on a processor of an apparatus (such as e.g. according to the above fourth aspect and/or developments or modifications thereof), to perform the method according to the above second aspect and/or developments or modifications thereof).

According to further developments or modifications of the present invention, the computer program product according to the fifth and/or sixth aspect comprises a computer-readable medium on which the software code portions are stored, and/or the program is directly loadable into a memory of the processor.

By way of exemplary embodiments of the present invention, there are provided mechanisms and measures for facilitating efficient handover control in networks with several types of backhaul connections.

By way of exemplary embodiments of the present invention, there are provided mechanisms and measures for facilitating efficient handover control in relay-enhanced access networks and/or access networks that contain femto cells.

By way of exemplary embodiments of the present invention, there are provided mechanisms and measures for enabling a selective handover control for/in networks with several types of backhaul connections on the basis of packet delay considerations (including expected and/or tolerable packet delays).

BRIEF DESCRIPTION OF THE DRAWINGS

In the following, the present invention will be described in greater detail by way of non-limiting examples with reference to the accompanying drawings, in which.

DETAILED DESCRIPTION OF EMBODIMENTS OF THE PRESENT INVENTION

Figure 1:
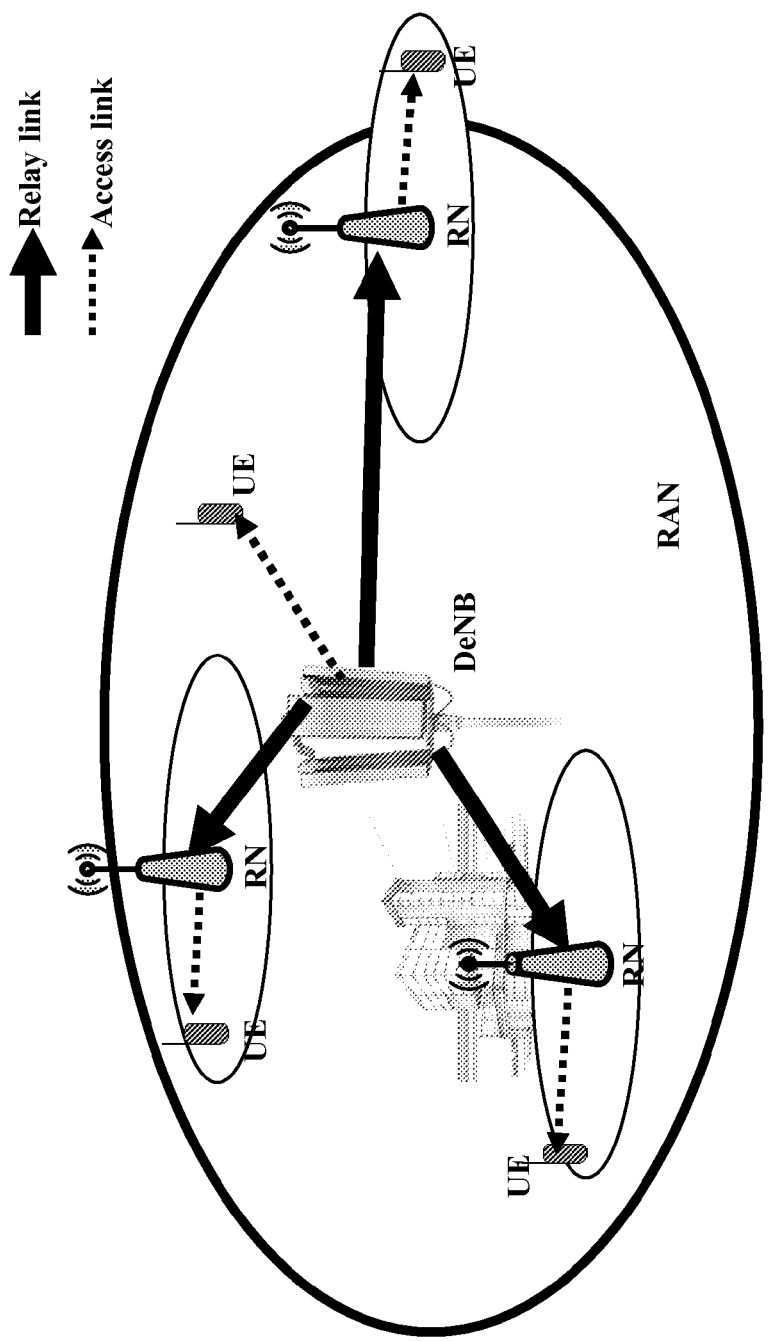
FIG. 1 shows a schematic diagram of a typical deployment scenario of a relay-enhanced access network.
Figure 2:
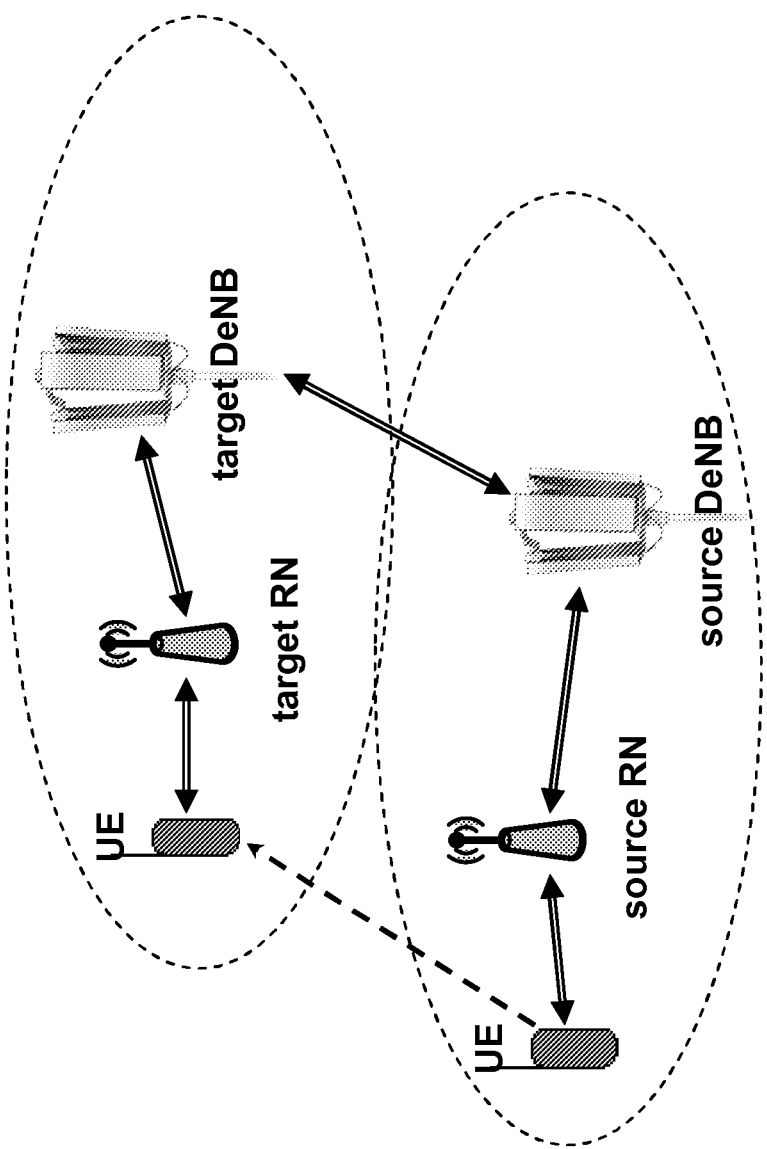
FIG. 2 shows a schematic diagram of a handover scenario in a deployment scenario of a relay-enhanced access network.
Figure 3:
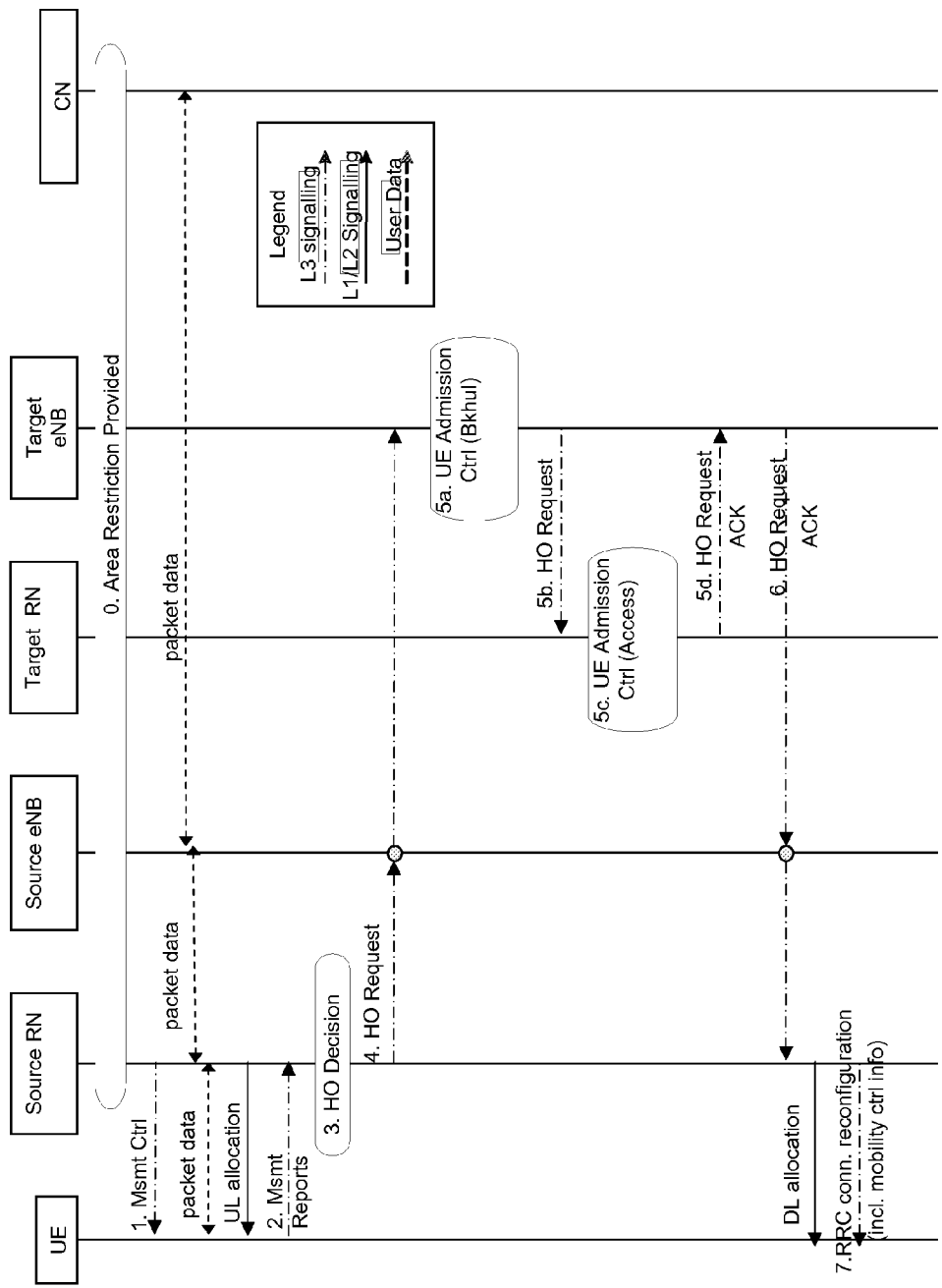
FIG. 3 shows a signaling diagram of a handover preparation procedure in the handover scenario according to FIG. 2.

The present invention is described herein with reference to particular non-limiting examples and to what are presently considered to be conceivable embodiments of the present invention. A person skilled in the art will appreciate that the invention is by no means limited to these examples, and may be more broadly applied.

The present invention and its embodiments are mainly described in relation to 3GPP specifications being used as non-limiting examples for certain exemplary network configurations and deployments. In particular, an LTE (E-UTRAN) radio access network and corresponding standards (LTE releases 8, 9 and LTE-Advanced release 10 and beyond) are used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Generally, embodiments of the present invention may be applicable for/in any kind of modern and future communication network including any conceivable mobile/wireless communication networks according to 3GPP (Third Generation Partnership Project) or IETF (Internet Engineering Task Force) specifications.

In particular, embodiments of the present invention may be applicable in any access system or network comprising backhaul connections (between base stations), such as for example in any relay-enhanced (cellular) access system where backhaul connections exist between base stations of different hierarchical level in terms of logical and/or structural network deployment (e.g. between relay nodes and donor base stations and/or, in case of multi-hopping, between two relay nodes), and/or such as for example in any (cellular) access network with macro/micro/pico and femto cells where different types of backhaul connections exist between the different types of base stations and the core network. Embodiments of the present invention may also be applicable in any other system that employs different backhaul technologies with the (mobile) core network, leading to different end-to-end delay characteristics than a normal LTE macro base station based system using homogeneous backhaul technology.

Generally speaking, embodiments of the present invention are directed to handover control in networks with several types of backhaul connections, and are applicable to any networks with several types of backhaul connections as explained herein.

In the description hereafter, relaying will be used as an exemplary case for the sake of brevity, but a person skilled in the art will appreciate that the invention is by no means limited to relaying, and may be more broadly applied to other cases like HNBs and HeNBs (femto cells), or other systems employing different backhaul connectivity, where the end-to-end delay characteristics vary depending on the choice of the base station.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

For the description of exemplary embodiments of the present invention, a relay-enhanced access network, such as that according to the exemplary illustration of FIG. 1, is used as an exemplary, illustrative and non-limiting basis.

In the following, exemplary embodiments of the present invention are described with reference to methods, procedures and functions, as well as with reference to structural arrangements and configurations.

According to exemplary embodiments of the present invention, there are provided mechanisms, measures and means for evaluating the suitability (applicability) of an access node cell as target for a handover of a terminal. In this regard, an access node may be any base station of an underlying network environment, e.g. a relay node or home base station, and the evaluation may be performed by or at a donor/macro base station or another relay/femto cell. Such evaluation may be based on various parameters and/or sets of parameters. According to exemplary embodiments of the present invention, such evaluation may be based on delay-related parameters (e.g. an expected packet delay in the cell of the concerned access node and/or a tolerable packet delay for the concerned terminal) and/or parameters relating to signal quality in the cell of the concerned access node.

Hereinafter, a base station is adopted as an exemplary and non-limiting example of an access node according to embodiments of the present invention.

Figure 4:
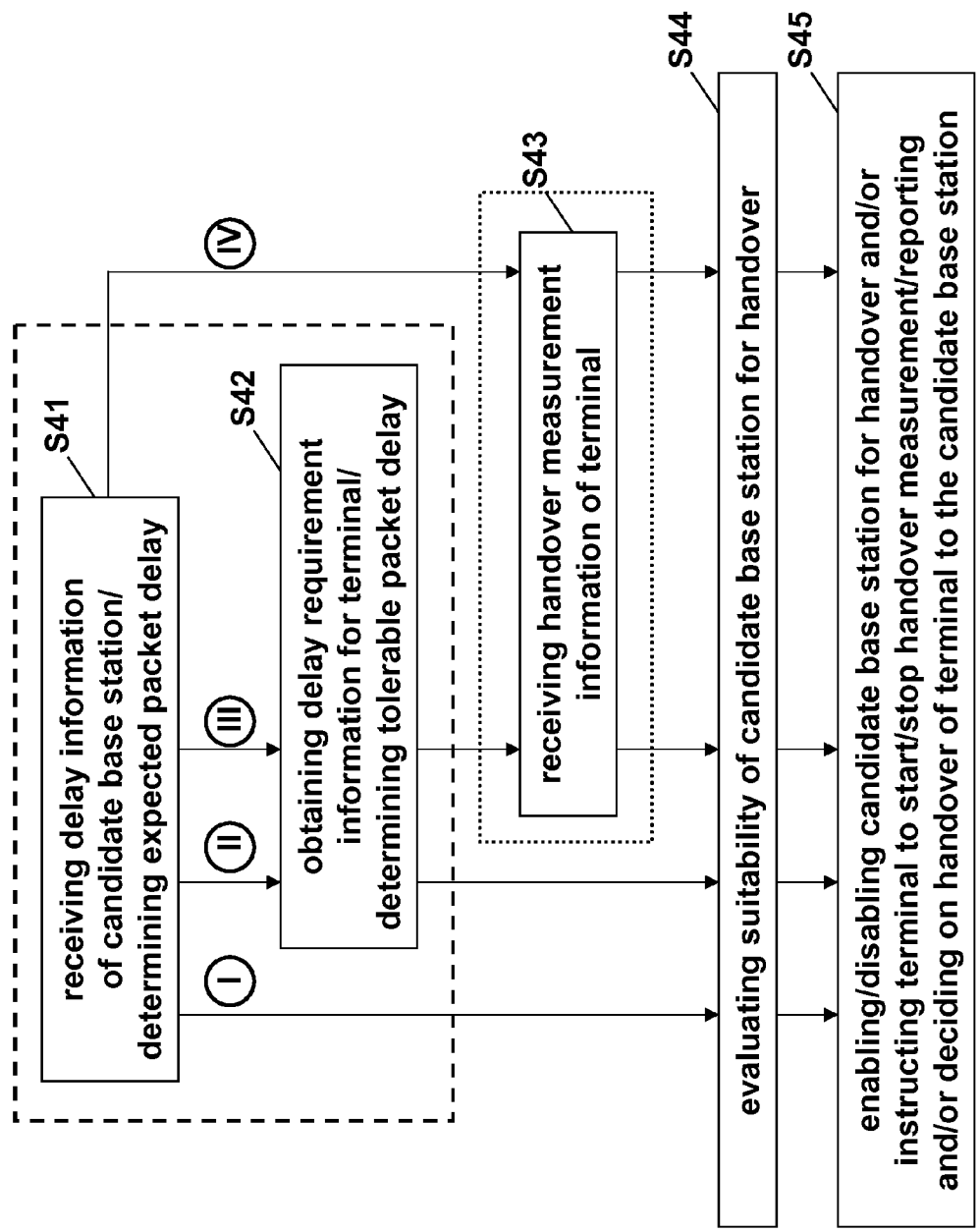
FIG. 4 shows a schematic flow chart of various procedures according to exemplary embodiments of the present invention.

FIG. 4 shows a schematic flow chart of various procedures according to exemplary embodiments of the present invention. According to exemplary embodiments of the present invention, the various procedures according to FIG. 4 may be performed by or at a base station serving as a source base station of a potential terminal handover, such as e.g. a donor base station DeNB or another relay node RN.

In FIG. 4, four alternative procedures according to exemplary embodiments of the present invention are illustrated, which mainly deviate in terms of parameters being used of evaluating the suitability of a concerned cell for handover.

It is to be noted that these four alternative procedures are independent of each other, and their choice is independent of findings/outcomes or properties within the individual procedures. That is, when one of the four alternative procedures is chosen or implemented, it proceeds as illustrated without being affected by any findings/outcomes or properties in the course thereof.

Also, it is noted that the individual operations of any one of the four alternative procedures is not necessarily fixed and/or such as exemplarily depicted in FIG. 4. For example, the sequence of operations S41, S42 and S43 in the respective procedures may be changed.

Namely, the exemplary procedure denoted by (I) basically comprises the operations of steps S41 and S44, thus using delay-related parameters in the form of an expected packet delay in the concerned cell as a basis for the evaluation, the exemplary procedure denoted by (II) basically comprises the operations of steps S41, S42 and S44, thus using delay-related parameters in the form of an expected packet delay in the concerned cell and a tolerable packet delay for the concerned terminal as a basis for the evaluation, the exemplary procedure denoted by (III) basically comprises the operations of steps S41, S42, S43 and S44, thus using delay-related parameters in the form of an expected packet delay in the concerned cell and a tolerable packet delay for the concerned terminal as well as signal quality-related parameters of the concerned cell as a basis for the evaluation, and the exemplary procedure denoted by (IV) basically comprises the operations of steps S41, S43 and S44, thus using delay-related parameters in the form of an expected packet delay in the concerned cell as well as signal quality-related parameters of the concerned cell as a basis for the evaluation.

The dashed box in FIG. 4 indicates that the thus encircled operations S41 and S42 relate to delay-based parameters, and the dotted box indicates that the thus encircled operation S43 relates to signal quality-related parameters.

In the operation of step S41, the source base station may receive delay information being indicative of an expected packet delay in the concerned cell, i.e. a candidate cell for a terminal handover. The delay information may be received from the base station of the concerned cell or any intermediate network node. Also, the source base station may determine the expected packet delay based on the received delay information, depending on whether an implementation is based on processing of the information or the extracted delay as such.

According to exemplary embodiments of the present invention, the delay information may comprise one or more of measurement information of an actual packet delay in the cell of the base station, resource characteristic and/or resource usage information of the base station (relating to backhaul resources), mobility characteristic information of the base station, and multi-hopping characteristic information of the base station.

The measurement information may basically relate to an actually measured value of packet delay in the concerned cell, which may be measured at the concerned base station itself and then transmitted.

The resource characteristic and/or resource usage information may basically relate to backhaul resources. In the case of a relay-enhanced access network, this refers to whether the concerned RN is an out-band or in-band relay, which fact may have a significant impact on the delay experienced by UEs connected via RNs. This is because out-band relays have a dedicated backhaul resource allocated (for example, on a separate carrier), while in-band relays have to rely on the number of sub-frames e.g. assigned for MBSFN sub-frames for their backhaul operation. And this backhaul MBSFN sub-frame allocation can be dynamic (i.e. a RN might have the possibility to use four sub-frames out of ten in a given radio frame for backhaul operation at one instant, and possibly only one sub-frame allocated to the backhaul if the DeNB is a bit overloaded at another instant). As a consequence, the delay properties may vary dynamically as well.

The mobility characteristic information may basically relate to the fact whether the RN is stationary/fixed or mobile. In the case of a relay-enhanced access network, though not supported in release 10 or below, release 11 and beyond of LTE/LTE-Advanced may support mobile RNs. The backhaul link of a mobile RN may not be as reliable as that of a fixed RN, which can increase the experienced delay of UEs connected to mobile RNs. Moreover, if the UE is stationary/fixed and even worse moving in a direction opposite to the mobile RN, the effective cell size of the RN or the usability of the RN for that UE is reduced with time.

The multi-hopping characteristic information may basically relate to the fact whether or not the access network supports multi-hopping. In the case of a relay-enhanced access network, though not supported in recent releases, future releases such as release 10 and beyond of LTE/LTE-Advanced may support multi-hop RNs. The number of hops between a RN of a concerned/target cell (i.e. a handover candidate) and its controlling DeNB (target DeNB) may also have a significant impact on the packet delay of UEs, because the data has to traverse several hops, where each hop may have its own backhaul resource limitations. The multi-hopping characteristic information may comprise cumulative delay information, including delay information of the concerned base station and any base stations between the concerned base station and its controlling DeNB, and/or relay depth information, being indicative of a number of relay levels between the concerned base station and its controlling DeNB.

In the operation of step S42, the source base station may obtain delay requirement information being indicative of a tolerable packet delay for the terminal, i.e. the terminal subject to the handover process. The delay requirement information may be obtained locally by using the respective knowledge of communication specifics of the served terminal. Also, the source base station may determine the tolerable packet delay based on the obtained delay requirement information, depending on whether an implementation is based on processing of the information or the extracted delay as such.

According to exemplary embodiments of the present invention, the delay requirement information may comprises one or more of a number of active bearers of the terminal, a type of the one or more active bearers of the terminal (wherein the type may indicate whether or not the bearer is of real-time nature), and a delay characteristic of the one or more active bearers of the terminal (wherein the delay characteristic may indicate the degree of delay sensitivity of the bearer).

In the operation of step S43, the source base station may receive handover measurement reporting information being indicative of a signal quality (signal strength) in the cell of the base station for the terminal, i.e. the terminal subject to the handover process. The handover measurement information may be received from the served terminal.

In the operation of step S44, the source base station may evaluate the suitability (applicability) of the concerned cell as target for a handover of the concerned terminal. As mentioned above, such evaluation is based on the available parameters, depending on the various procedures (I), (II), (III) and (IV), respectively.

According to exemplary embodiments of the present invention, the evaluation of step S44 may comprise a comparison of relevant parameters or sets of parameters representing expected cell conditions for handover with relevant parameters or sets of parameters representing tolerable or required cell conditions for handover, and a corresponding finding on whether the expected cell conditions are capable of satisfying the tolerable or required cell conditions.

According to exemplary embodiments of the present invention, as mentioned above, more than one parameter or set of parameters may be used as a basis for the evaluation of step S44. This is particularly the case in the procedures (II), (III) and (IV) according to FIG. 4. In such case, the evaluation may be made using predetermined relative weights of any one of the parameters on which the evaluation is based. Thereby, the influence of the individual parameters on suitability evaluation may be adjusted as desired and/or most appropriate in view of the underlying network architectures, requirements, or the like, and it may be ensured that the suitability evaluation is made identically or, at least, equivalently throughout the access network in question. Accordingly, unnecessary and/or inappropriate handovers may be avoided.

For example, considering a scenario where there exist three cells, namely A, B and C, and where the UE is served by cell A but moves away and needs to be handed over, wherein cell B has better HO measurements (i.e. better signal quality/strength) but slightly insufficient delay, while cell C has worse signal quality/strength but better delay conditions. In such scenario, it may happen that cell A initially hands over the UE to cell B based on the signal strength parameter, and immediately afterwards, cell B hands over the UE to cell C based on the delay parameter. Then, it would have been better if cell A handed over the UE immediately to cell C. Even worse, it may happen that cell C could then hand over the UE back to cell B based on the signal strength parameter, and consequently the UE may be handed over continually between cells B and C, thus resulting in a ping-pong handover. To avoid such scenarios, according to exemplary embodiments of the present invention, trade-off between the individual parameters (e.g. between the delay parameter (represented e.g. by the delay information) and signal strength parameter (represented e.g. by the handover measurement and/or reporting thereof)) for suitability decision and/or handover decision may be made so as to be consistent throughout the access network. This may be accomplished either by agreeing beforehand about the handover strategy and the relative weights of different parameters, or by setting the handover strategy and the relative weights of different parameters during the operation of the network e.g. by some Self Organizing Network (SON) functionality of the base stations thereof.

In the operation of step S45, the source base station may perform a processing relating to the base station (BS), the handover (HO) and/or the terminal (UE), also referred to as BS/HO/UE processing in FIG. 6 below. Such a BS/HO/UE processing may depend on the outcome of the evaluation in step S44, i.e. whether the concerned base station or cell is decided to be suitable or unsuitable for a handover, as well as on the occasion of the evaluation, i.e. whether the evaluation is made pre-emptively irrespective of a handover demand of the terminal and/or on demand with respect to a handover demand of the terminal (wherein a handover demand refers to a situation in which a handover is desirable, for example).

Such a BS/HO/UE processing may comprise an enabling of the concerned cell as target for the handover, when the base station is evaluated to be suitable (appropriate) in the operation of step S44, or disabling of the concerned cell as target for the handover, when the base station is evaluated to be unsuitable (inappropriate) in the operation of step S44.

Such a BS/HO/UE processing may comprise performing admission control for a handover of the terminal to the base station based on the received delay information and/or the determined expected packet delay of the base station, when the base station is evaluated to be suitable (appropriate) in the operation of step S44.

Such a BS/HO/UE processing may comprise instructing the terminal to (re-)start handover measurement and/or handover measurement reporting for the concerned cell or base station, when the base station is evaluated to be suitable (appropriate) and, thus, (again) enabled, or instructing the terminal to stop handover measurement and/or handover measurement reporting for the concerned cell or base station, when the base station is evaluated to be unsuitable (inappropriate) and, thus, disabled. For example, if the UE's most delay-sensitive bearers are terminated and/or if the RN cell's delay is reduced (for example, due to the assignment of more sub-frames for the backhaul link), the UE may be instructed to restart the (previously stopped) measurement reporting of the RN cell, or vice versa.

Such a BS/HO/UE processing may comprise deciding on a handover (i.e. making a handover decision) of the terminal to the concerned cell or base station, when the base station is evaluated to be suitable (appropriate) and, thus, enabled. Such handover decision may be based on the evaluated suitability of the concerned cell or base station with respect to a suitability and/or existence of one or more other cells or base stations. When a handover decision is made, the source base station may send a corresponding handover request e.g. to the base station of the candidate or potential target cell being suitable (and enabled).

For example, there may be cases where the source base station happens to be a RN and the UE activates new bearers that have delay requirements that the RN cell can not satisfy. In this case, according to exemplary embodiments of the present invention, the source base station (e.g. "donor" RN or DeNB) may start a (pre-emptive) handover to a suitable neighbouring node, even if the signal of the RN cell has a better quality than all the neighbours.

For example, there may be cases where the RNs that can serve a UE (i.e. candidate RNs) do not satisfy the delay requirements (i.e. are not suitable), in particular if RNs are deployed for coverage extension, as explained in connection with FIG. 1 above. In this case, according to exemplary embodiments of the present invention, it may be better to have the UE served by the concerned RN, even though the delay for some bearers is not met, rather than dropping the UE completely. That is, a handover to the concerned RN may be done despite insufficient delay characteristics of the concerned cell, if there is no other (or no better) node to which the UE can be handed over.

According to exemplary embodiments of the present invention, there are provided mechanisms, measures and means for generating and/or exchanging information which is relevant for evaluating the suitability (applicability) of a cell of a base station as target for a handover of a terminal, wherein such relevant information is transmitted from a base station, such as e.g. a relay node, towards an apparatus, such as e.g. a donor base station or another relay node, in charge of the evaluation of the suitability. Such relevant information may comprise various parameters and/or sets of parameters. According to exemplary embodiments of the present invention, such relevant information may comprise delay-related parameters (e.g. an expected packet delay in the cell of the concerned base station and/or a tolerable packet delay for the concerned terminal).

Figure 5:
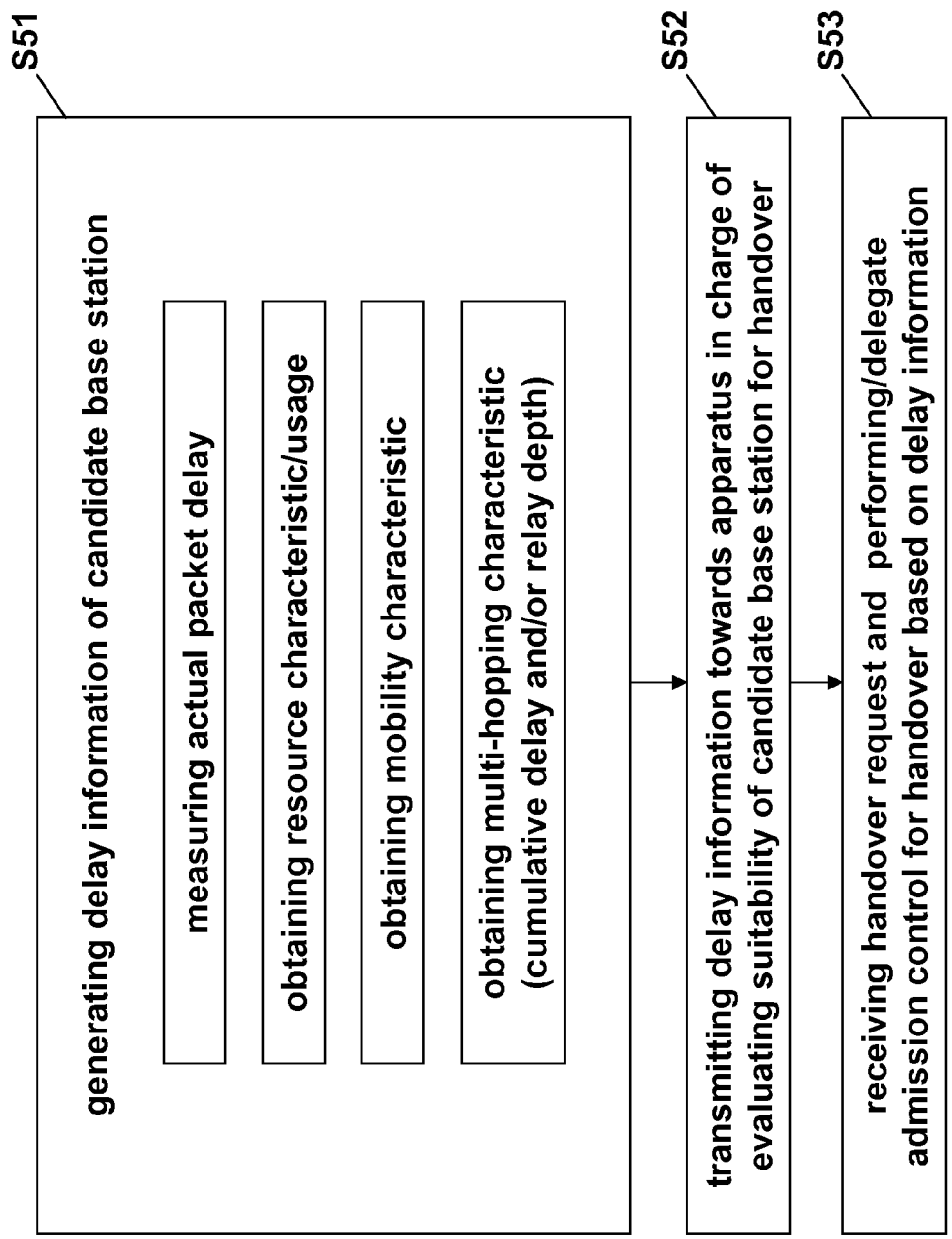
FIG. 5 shows a schematic flow chart of a procedure according to exemplary embodiments of the present invention.

FIG. 5 shows a schematic flow chart of a procedure according to exemplary embodiments of the present invention. According to exemplary embodiments of the present invention, the procedure according to FIG. 5 may be performed by or at a base station of a cell serving as a candidate or potential target of a potential terminal handover, such as e.g. any relay node RN in a relay-enhanced access network.

In the operation of step S51, the base station of the candidate or potential target cell may generate delay information being indicative of an expected packet delay in its cell.

The thus generated delay information was described above in connection with their receipt at the suitability decision entity such the apparatus configured to perform any one of the procedures according to FIG. 4. That is, the delay information may comprise one or more of measurement information of an actual packet delay in the cell of the base station, resource characteristic and/or resource usage information of the base station (relating to backhaul resources), mobility characteristic information of the base station, and multi-hopping characteristic information of the base station.

According to exemplary embodiments of the present invention, the base station of the candidate or potential target cell may perform corresponding operations for obtaining the respective information and for including thus obtained respective information in the delay information thus being generated. For example, as indicated by the boxes within step S51 in FIG. 5, the base station of the candidate or potential target cell may measure the actual packet delay, may obtain the resource characteristic and/or a resource usage, may obtain the mobility characteristic, and/or may obtain the multi-hopping characteristic, wherein obtaining the multi-hopping characteristic may comprise calculating the cumulative delay of the base station of the candidate or potential target cell, and/or specifying the relay depth of the base station of the candidate or potential target cell.

According to exemplary embodiments of the present invention, rather than communicating details of backhaul usage, mobility and multi-hopping aspects of the RN or the like, the base station of the candidate or potential target cell may measure and communicate the actual packet delay itself. To this end, e.g. the RNs according to exemplary embodiments of the present invention may perform (long-term) measurements of the packet delay experienced by their UEs, and may communicate it to their donors (i.e. donor RN and/or DeNB). Yet, if the backhaul sub-frame configurations are performed in a dynamic way and there are frequent updates, this information may potentially be misleading (which is why it may be preferable to use it in a combined manner with other aspects of delay information outlined above).

According to exemplary embodiments of the present invention, the delay information may be transmitted or exchanged over the access network by way of the superordinate ("donor") base station, such as the DeNB in case of a relay-enhanced access network. That is, for example, the DeNB may carry out the communication of the delay information (including backhaul usage, mobility and multi-hopping nature of the RN, etc.) towards the RN neighbours of the concerned RN. This is feasible, as in the architecture for LTE-Advanced release 10, the DeNB is responsible for maintaining X2 connections on behalf of the RN, and the RN will look like a cell of the DeNB.

According to exemplary embodiments of the present invention, the base station of the candidate or potential target cell (e.g. the concerned RN) may send information about mobility support to its DeNB during startup and/or attachment procedures. Later on, when X2 connections are formed between the DeNB and other neighbouring nodes on behalf of the RN, the DeNB may pass this information to the neighbour nodes, for example, using a modified version of the release 8 Served Cell Information IE (IE: information element) that is included in the X2 setup request or in a eNB Configuration Update if X2 is already setup and the parameters of a new DeNB cell (i.e. the RN) need to be communicated to neighbours. The multi-hopping case may be similar, except that the information may propagate from RN to RN, until it reaches the DeNB. A modified version of the Served Cell Information IE as specified in release 8, which may also be included in eNB configuration update messages, may be used for communicating the mobility support.

According to exemplary embodiments of the present invention, the backhaul usage information may be available at the DeNB, and thus may readily be sent to neighbour nodes (e.g. RNs). In the case of a multi-hopping setting, assuming that "donor" RNs may set the backhaul link between them and their child RNs independently of the DeNB, there may be a need to propagate the backhaul setup information back to the DeNB so that it may be communicated to the neighbour nodes during X2 setup or eNB Configuration Update of the child RNs. A modified version of the release 8 Served Cell Information IE, which may also be included in eNB configuration update messages, may be used for communicating the backhaul usage.

According to exemplary embodiments of the present invention, the base station of the candidate or potential target cell may specify its relay depth as follows. Namely, the depth of the hop e.g. the RN is in (i.e. how many hops before reaching its controlling DeNB) may be found in that (i) the DeNB will have a "depth" parameter of 0, (ii) when the first level children RNs connect to the DeNB, they will be informed about their DeNB's depth and then set their "depth" parameter to 1, and (iii) RNs connecting to the level 1 RNs will be informed that the depth of their "DeNB" is 1, and then set their "depth" parameter to 2, and so on. That is, RNs connecting to the level n RNs will be informed that the depth of their "DeNB" is n, and then set their "depth" parameter to n+1.

According to exemplary embodiments of the present invention, the base station of the candidate or potential target cell may calculate the cumulative delay as follows. Namely, instead of calculating the level of relaying with the depth parameter, the cumulative delay may be calculated in that (i) the DeNB will have a "delay" parameter of 0, or of the processing delay that it needs to pass on messages arriving via S1 to the air interface, which is mainly implementation dependent and depends on how many backhaul sub-frames are configured (as messages have to wait for them to be forwarded to the next relay), (ii) when the first level children RNs connect to the DeNB, they will be informed about their DeNB's delay and then add to that their own delay (including delay caused by MBSFN configuration to further child RNs and implementation specific delays for processing), and (iii) RNs connecting to the level 1 RNs, will be informed that the accumulated delay of their serving RNs (they act like a "DeNB"), and then add their own delay as well, and so on. In the operation of step S52, the base station of the candidate or potential target cell may transmit the generated delay information towards the suitable decision entity such as the apparatus configured to perform any one of the procedures according to FIG. 4.

As is evident from the above, according to exemplary embodiments of the present invention, there are presented mechanisms for evaluating the suitability/appropriateness of a candidate cell of a base station in a backhaul connection, as well as a corresponding enabling/disabling of the thus evaluated candidate cell as a possible handover target for a given UE. According to exemplary embodiments of the present invention, such evaluation and such corresponding enabling/ disabling (as well as, consequently, a resulting handover decision) is based on delay-related parameters, in particular an expected packet delay in the candidate cell. According to exemplary embodiments of the present invention, such evaluation and such corresponding enabling/disabling (as well as, consequently, a resulting handover decision) may additionally be based on further delay-related parameters such as a tolerable packet delay (representing delay requirements) for a terminal subject to handover processing and/or measurement-related parameters of the handover source cell such as signal quality/strength thereof.

As an optional features, in the operation of step S53, the base station of the candidate or potential target cell may receive a handover request for a handover of the terminal to the access node cell, e.g. from the apparatus in charge of evaluating suitability of candidate base station for handover, and may perform admission control for the handover of the terminal to the access node cell based on the relevant delay information, e.g. the expected packet delay of the access node cell, or may delegate another access node to perform admission control for the handover of the terminal to the access node cell based on the relevant delay information, e.g. the expected packet delay of the access node cell, on behalf of itself.

An admission control according to exemplary embodiments of the present invention, as indicated above, may be featured by the consideration of the relevant delay information, e.g. expected packet delay.

Generally, an admission control according to exemplary embodiments of the present invention, as indicated above, may be effected at the base station of the candidate or potential target cell, e.g. a RN, at a base station controlling the base station of the candidate or potential target cell, e.g. a DeNB, and/or an intermediate base station (in the case of multiple hops). That is, the RN of the candidate or potential target cell may perform the admission control on its own or may delegate the admission control to another access node, e.g. the DeNB and/or an intermediate RN.

When being effected at the RN, as outlined above, an admission control according to exemplary embodiments of the present invention may be performed at the RN for its cell being the candidate or potential target cell upon receipt of a corresponding handover request.

When being effected at the DeNB, i.e. a control level of the candidate or potential target cell, an admission control according to exemplary embodiments of the present invention may be featured as follows. When the DeNB receives a handover request destined to one of the cells of the RNs under its control, as the DeNB has information regarding the expected delays of that RN cell under its control, it is able to perform admission control on behalf of the RN cell. That is to say, instead of the RN, which is the base station of the final target of the handover, admission control may be performed at the DeNB controlling the RN of the target cell.

When being effected at an intermediate base station (in the case of multiple hops), an admission control according to exemplary embodiments of the present invention may be performed such that, when exemplarily assuming a deployment setting such as DeNB→RN1→RN2→RN3 ... →RNm, any intermediate base station RNx may perform the admission control on behalf of any other base station RNy (for x<y).

As is evident from the above, exemplary embodiments of the present invention are based on the finding that cells of backhaul base station (such as e.g. relay node cells) may differ quite a lot from cells of non-backhaul/macro base station (such as e.g. eNB/DeNB cells), specially with regard to the expected (average) packet delay. Namely, the delay in the backhaul (RN) cell may be quite higher than that of a non-backhaul/macro (eNB/DeNB) cell or an independent femto cell. This difference in the delay conditions, which is unlike the case of femto cells where the cell size is the main (if not the only) difference from the macro eNBs, may result from any one of the factors of backhaul usage, mobility, multi-hopping, as outlined above.

As is evident from the above, because of the expected increase in packet delay in backhaul candidate cells, exemplary embodiments of the present invention propose to consider active bearers of the UE (i.e. their number and/or type and/or delay characteristics) and to evaluate/decide/estimate whether their delay requirements can be met in a backhaul candidate cell before performing further handover processing. Accordingly, the handover control for backhaul connections according to exemplary embodiments of the present invention is enhanced or improved as compared with conventional handover control on the basis of a standard signal strength comparison only. To this end, exemplary embodiments of the present invention propose that base stations of backhaul candidate cells make available relevant information for suitability evaluation to respective entities.

As is evident from the above, exemplary embodiments of the present invention propose that, from the relevant information such as actual packet delay, backhaul usage, mobility and multi-hopping information about a RN cell, a source node may estimate if the expected packet delay is acceptable for the UE being considered to be handed over, and even disable handover measurement reporting for an unsuitable and/or disabled RN cell.

With the mechanisms proposed according to exemplary embodiments of the present invention, it may be ensured that UEs will be handed over to RN cells considering whether the RN cell is able to satisfy the delay requirements of the active bearers of the UE, while optionally considering (but not only) signal quality or strength. A pre-emptive decision may also be made to instruct the UE to stop measurements reporting of certain cells, if it is found out that the cell/s is/are not able to satisfy the requirements of the active bearers of the UE, thereby saving system resources that would have been utilized for measurement reports.

By way of exemplary embodiments of the present invention, it may be efficiently avoided that an active bearer is to be dropped and/or a quality-of-service (QoS) of an active bearer is adversely affected due to a handover of the terminal to a cell not satisfying the delay requirements of the terminal's active bearer or bearers.

Exemplary embodiments of the present invention may be completely transparent to the UEs, and as such release 8 UEs can benefit from them (even if the base stations involved are of release 9 and beyond). Exemplary embodiments of the present invention may be implemented by way of minor updates in the access nodes or base stations (DeNBs and RNs, etc.), such as the communication of actual packet delay, backhaul usage, mobility, and multi-hopping aspects, and so on, as outlined above.

The mechanisms proposed according to exemplary embodiments of the present invention may be applied for any kind of backhaul connections, while they may be particularly beneficial in any kind of relay-enhanced access network, such as e.g. an LTE/LTE-Advanced network that supports relaying. For example, the mechanisms proposed according to exemplary embodiments of the present invention may be beneficially applied in LTE 3GPP standards of release 10/11/12/ ... (LTE-Advanced and its evolutions).

The above-described procedures and functions may be implemented by respective functional elements, processors, or the like, as described below.

While in the foregoing exemplary embodiments of the present invention are described mainly with reference to methods, procedures and functions, corresponding exemplary embodiments of the present invention also cover respective apparatuses, network nodes and systems, including both software and/or hardware thereof.

Respective exemplary embodiments of the present invention are described below referring to FIG. 6, while for the sake of brevity reference is made to the detailed description of respective corresponding methods and operations according to FIGS. 4 and 5 above as well as to the detailed description of an underlying network architecture according to FIG. 1 above.

Figure 6:
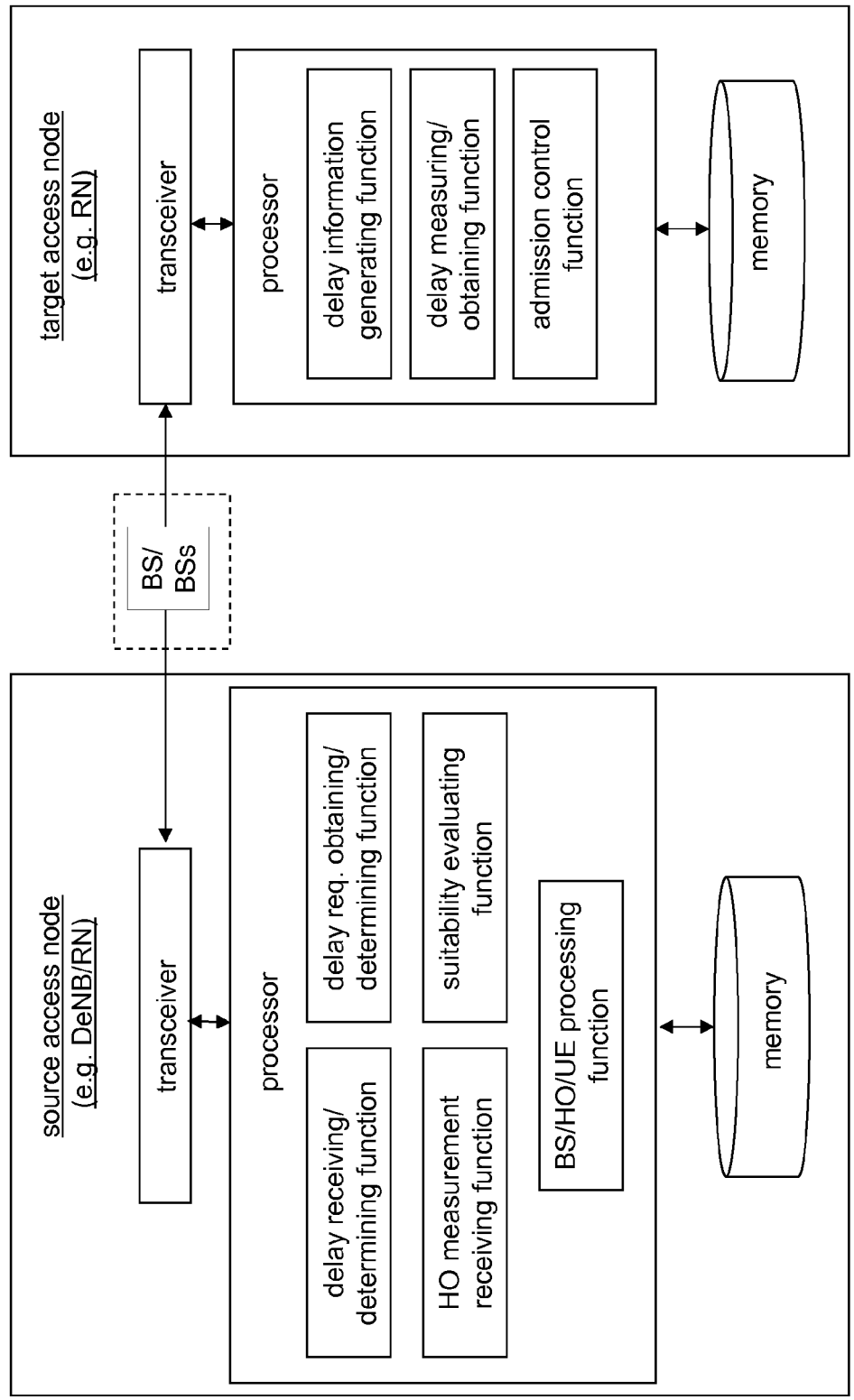
FIG. 6 shows a schematic block diagram of various devices according to exemplary embodiments of the present invention.

In FIG. 6 below, the solid line blocks are basically configured to perform respective operations as described above. The entirety of solid line blocks are basically configured to perform the methods and operations as described above, respectively. With respect to FIG. 6, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows interconnecting individual blocks are meant to illustrate an operational coupling there-between, which may be a physical and/or logical coupling, which on the one hand is implementation-independent (e.g. wired or wireless) and on the other hand may also comprise an arbitrary number of intermediary functional entities not shown. The direction of arrow is meant to illustrate the direction in which certain operations are performed and/or the direction in which certain data is transferred.

Further, in FIG. 6, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Among others, memories are provided for storing programs or program instructions for controlling the individual functional entities to operate as described herein.

FIG. 6 shows a schematic block diagram of various devices according to exemplary embodiments of the present invention. Any one of the thus depicted devices may be an apparatus according exemplary embodiments of the present invention, and any combination of the thus depicted devices (e.g. a combination of source access node or base station and target access node base station, with or without an arbitrary number of intermediate devices) may be a system according exemplary embodiments of the present invention.

In view of the above, the thus described apparatus on the left side may represent a (part of a) apparatus such as an access node or a base station on a source side of a potential handover (e.g. eNB, DeNB, RN), as described above, and the thus described apparatus on the right side may represent a (part of a) apparatus such as a potential or candidate access node or base station on a target side of a potential handover (e.g. RN), as described above.

According to FIG. 6, the apparatus on the left side is an apparatus according to exemplary embodiments of the present invention. This apparatus is configured to perform a procedure as described in conjunction with FIG. 4. Therefore, while basic functionalities are described hereinafter, reference is made to the above description of FIG. 4 for details thereof.

According to FIG. 6, the thus depicted apparatus according to exemplary embodiments of the present invention comprises a processor and a receiver as well as, optionally, a memory.

The receiver may be specifically configured to receive delay information being indicative of an expected packet delay in a cell of an access node (a base station) in an access network, thus representing means for receiving delay information. The thus received delay information are those described above, and they may be received from an apparatus of a candidate or potential target access node (base station) as well as any kind of intermediate nodes (such as intermediate RNs in a multi-hopping scenario) being indicated by a dashed block in FIG. 6.

The processor may be specifically configured to evaluate the suitability of a candidate or potential target access node cell as target for a handover of a terminal, thus representing means for evaluating access node (base station) suitability. In other words, the processor may have a corresponding suitability evaluating function. The suitability evaluating function may be based on any kind of available information being relevant for suitability evaluation, as outlined above in connection with the various alternative procedures according to FIG. 4. That is, the suitability evaluating function may be based on expected packet delay, tolerable packet delay and signal strength/quality parameters in any one of the aforementioned combinations thereof.

In view thereof, the processor may be specifically configured in different ways, i.e. may have different functions.

The processor may be specifically configured to receive the delay information from the receiver and, optionally, to determine the expected packet delay on the basis of the delay information, thus representing means for receiving or for receiving and determining a cell delay. In other words, the processor may have a corresponding delay receiving/determining function.

The processor may be specifically configured to obtain delay requirement information and, optionally, to determine the tolerable packet delay on the basis of the delay requirement information, thus representing means for obtaining or for obtaining and determining terminal delay requirements. In other words, the processor may have a corresponding delay requirement obtaining/determining function. The thus obtained delay requirement information are those described above, and they may be obtained on the basis of local knowledge of the terminal's active bearers which are to be known at the serving access node (base station).

The processor may be specifically configured to receive handover measurement reporting information from the receiver, thus representing means for receiving a handover measurement. In other words, the processor may have a corresponding handover measurement receiving function. In such case, the receiver may be specifically configured to receive the handover measurement reporting information being indicative of a signal quality in the cell of the access node (base station) for the terminal, which are those as described above, from one or more served terminals performing the respective measurements. Thus, the receiver may represent means for receiving handover measurement reporting information.

The processor may be specifically configured to evaluate using predetermined relative weights of any one of the parameters on which the evaluation is based, and/or to evaluate pre-emptively irrespective of a handover demand of the terminal and/or on demand with respect to a handover demand of the terminal. In other words, the suitability evaluating function may be adapted accordingly.

The processor may be specifically configured to perform a processing relating to the access node (base station) (BS), the handover (HO) and/or the terminal (UE), also referred to as BS/HO/UE processing, thus representing means for performing a BS/HO/UE processing. In other words, the processor may have a BS/HO/UE processing function. The BS/HO/UE processing function may comprise any one of the processings described in connection with FIG. 4 in any conceivable combination. In this regard, the apparatus may have a transmitter (or transceiver) configured to send a corresponding handover request e.g. to the base station of the candidate or potential target cell being suitable (and enabled) when a handover decision is made.

The memory may be specifically configured to store any data required for and/or resulting from the above-described functions. For example, the memory may store information regarding suitable/unsuitable as well as enabled/disabled cells or access nodes (base stations), any received or obtained information building the basis for the suitability evaluation, and the like.

According to FIG. 6, the apparatus on the right side is an apparatus according to exemplary embodiments of the present invention. This apparatus is configured to perform a procedure as described in conjunction with FIG. 5. Therefore, while basic functionalities are described hereinafter, reference is made to the above description of FIG. 5 for details thereof.

According to FIG. 6, the thus depicted apparatus according to exemplary embodiments of the present invention comprises a processor and a receiver as well as, optionally, a memory.

The processor may be specifically configured to generate delay information being indicative of an expected packet delay in a cell of an access node (a base station) in an access network, thus representing means for generating delay information. In other words, the processor may have a corresponding delay information generating function. The thus generated delay information are those described above.

The processor may be specifically configured to perform measuring and/or obtaining operations as those described in connection with the blocks within step S51 according to FIG. 5, thus representing means for measuring and/or obtaining respective values/parameters/information (i.e. a cell delay). In other words, the processor may have a corresponding delay measuring/obtaining function. The delay measuring/obtaining function may comprise a function of including the thus measured/obtained information in the delay information being generated thereby.

The processor may be specifically configured to perform admission control for a handover of a terminal to an access node cell based on relevant delay information, e.g. the expected packet delay of the access node cell, thus representing means for performing admission control. In other words, the processor may have a corresponding admission control function. In this regard, the apparatus may have a receiver (or transceiver) configured to receive a handover request e.g. from the source base station when the source base station has made a corresponding handover decision.

The memory may be specifically configured to store any data required for and/or resulting from the above-described functions. For example, the memory may store any measured or obtained values, the generated delay information, and the like.

According to exemplarily embodiments of the present invention, a system may comprise any conceivable combination of the thus depicted apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

Generally, for the purpose of the present invention as described herein above, it should be noted that
  method steps and functions likely to be implemented as software code portions and being run using a processor at one of the entities, a network element, or a terminal (as examples of devices, apparatuses and/or modules thereof, or as examples of entities including apparatuses and/or modules thereof), are software code independent and can be specified using any known or future developed programming language, such as e.g. Java, C++, C, and Assembler, as long as the functionality defined by the method steps is preserved;
  generally, any method step is suitable to be implemented as software or by hardware without changing the idea of the invention in terms of the functionality implemented;
  method steps, functions, and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;
  devices, apparatuses, units or means can be implemented as individual devices, apparatuses, units or means, but this does not exclude that they are implemented in a distributed fashion throughout the system, as long as the functionality of the device, apparatus, unit or means is preserved,
  an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;
  a device may be regarded as an apparatus or as an assembly of more than one apparatus, whether functionally in cooperation with each other or functionally independently of each other but in a same device housing, for example.

The present invention also covers any conceivable combination of method steps and operations described above, and any conceivable combination of nodes, apparatuses, modules or elements described above, as long as the above-described concepts of methodology and structural arrangement are applicable.

There are provided measures for handover control for backhaul connections, said measures exemplarily comprising evaluation of the suitability of an access node cell in access network as target for a handover of a terminal based on delay information being indicative of an expected packet delay in a cell of the access node, wherein such delay information may be generated and/or exchanged in the access network. Said measures may exemplarily be applied for improving handover control in relay-enhanced access networks or networks that contain access nodes connected via different kinds of backhaul that can result in different end-to-end packet delays.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

The invention claimed is:
1. A method comprising
  receiving delay information being indicative of an expected packet delay in a cell of an access node in an access network,
    wherein the delay information relates to backhaul resources,
    wherein the backhaul resources are heterogeneous,
    wherein the heterogeneous backhaul resources comprise at least one of the following:
      backhaul resources between base stations of different hierarchical level in terms of logical, structural, or both logical and structural network deployment,
      backhaul resources between different types of base stations and the network,
      backhaul resources differing in technology from the network,
      backhaul resources differing in technology from a system using homogeneous backhaul technology,
      backhaul resources differing in handover from one another, and
      backhaul resources differing in connectivity from one another, where end-to-end delay characteristics vary depending on the choice of base station;
  evaluating the suitability of the access node cell as target for a handover of a terminal based on the expected packet delay of the access node cell; and enabling or disabling the access node cell as target for a handover of the terminal based on the evaluated suitability thereof.

2. The method according to claim 1, further comprising
obtaining delay requirement information being indicative of a tolerable packet delay for the terminal,
wherein the evaluating is based on the expected packet delay of the access node cell and the tolerable packet delay for the terminal.

3. The method according to claim 1, further comprising
receiving handover measurement reporting information being indicative of a signal quality in the cell of the access node for the terminal,
wherein the evaluating is based on the expected packet delay of the access node cell and the signal quality in the access node cell for the terminal.

4. The method according to claim 1, wherein
the evaluating is made using predetermined relative weights of any one of the parameters on which the evaluation is based, and/or
the evaluating is made pre-emptively irrespective of a handover demand of the terminal and/or on demand with respect to a handover demand of the terminal.

5. The method according to claim 1, wherein
the method further comprises determining the expected packet delay in the access node cell based on the received delay information, and/or
the delay information comprises one or more of
measurement information of an actual packet delay in the access node cell,
resource characteristic and/or resource usage information of the access node cell,
mobility characteristic information of the access node cell, and
multi-hopping characteristic information of the access node cell,
wherein the multi-hopping characteristic information of the access node cell may comprise
cumulative delay information, including delay information of the access node cell and any access nodes between the access node of the cell and its controlling access node, and/or
relay depth information, being indicative of a number of relay levels between the access node of the cell and its controlling access node, in case the access node of the cell is a relay node of a relay-enhanced access network.

6. The method according to claim 1, wherein
the method is operable at or by a donor base station controlling one or more relay nodes in a relay-enhanced access network, wherein said access node of said cell is a relay node, or the method is operable at or by a relay node in a relay-enhanced access network, wherein said access node is another relay node than said relay node, and/or
the method is operable at or by a macro base station, wherein said access node of said cell is a femto/home base station, or the method is operable at or by a femto/home base station, wherein said access node is another femto/home base station than said femto/home base station, and/or
said access node and/or an apparatus performing the method is part of an evolved radio access network in accordance with LTE and/or LTE-Advanced specifications.

7. An apparatus comprising
a receiver configured to receive delay information being indicative of an expected packet delay in a cell of an access node in an access network,
wherein the delay information relates to backhaul resources,
wherein the backhaul resources are heterogeneous,
wherein the heterogeneous backhaul resources comprise at least one of the following:
backhaul resources between base stations of different hierarchical level in terms of logical, structural, or both logical and structural network deployment,
backhaul resources between different types of base stations and the network,
backhaul resources differing in technology from the network,
backhaul resources differing in technology from a system using homogeneous backhaul technology,
backhaul resources differing in handover from one another, and
backhaul resources differing in connectivity from one another, where the end-to-end delay characteristics vary depending on the choice of the base station;
a processor configured to evaluate the suitability of the access node cell as target for a handover of a terminal based on the expected packet delay of the access node cell; and
enable or disable the access node cell as target for a handover of the terminal based on the evaluated suitability thereof.

8. The apparatus according to claim 7, wherein the processor is further configured to
obtain delay requirement information being indicative of a tolerable packet delay for the terminal, and
evaluate based on the expected packet delay of the access node cell and the tolerable packet delay for the terminal.

9. The apparatus according to claim 8, wherein
the processor is further configured to determine the tolerable packet delay for the terminal based on the received delay requirement information, and/or
the delay requirement information comprises one or more of
a number of active bearers of the terminal,
a type of the one or more active bearers of the terminal, and
a delay characteristic of the one or more active bearers of the terminal.

10. The apparatus according to claim 7, wherein
the receiver is further configured to receive handover measurement reporting information being indicative of a signal quality in the access node cell for the terminal, and
the processor is further configured to evaluate based on the expected packet delay of the access node cell and the signal quality in the access node cell for the terminal.

11. The apparatus according to claim 7, wherein the processor is further configured to
evaluate using predetermined relative weights of any one of the parameters on which the evaluation is based, and/or
evaluate pre-emptively irrespective of a handover demand of the terminal and/or on demand with respect to a handover demand of the terminal.

12. The apparatus according to claim 7, wherein the processor is further configured to
instruct the terminal to start or stop handover measurement and/or handover measurement reporting for the access node cell, when the access node cell is enabled or disabled, respectively, and/or decide on a handover of the terminal to the access node cell, when the access node cell is enabled, based on the evaluated suitability thereof with respect to a suitability and/or existence of one or more other access node cells.

13. The apparatus according to claim 7, wherein
the processor is further configured to determine the expected packet delay in the access node cell based on the received delay information, and/or
the delay information comprises one or more of measurement information of an actual packet delay in the access node cell,
resource characteristic and/or resource usage information of the access node cell,
mobility characteristic information of the access node cell, and
multi-hopping characteristic information of the access node cell,
wherein the multi-hopping characteristic information of the access node cell may comprise
cumulative delay information, including delay information of the access node cell and any access nodes between the access node of the cell and its controlling access node, and/or
relay depth information, being indicative of a number of relay levels between the access node of the cell and its controlling access node, in case the access node of the cell is a relay node of a relay-enhanced access network.

14. The apparatus according to claim 7, wherein
the apparatus is operable as or at a donor base station controlling one or more relay nodes in a relay-enhanced access network, wherein said access node of said cell is a relay node, or the apparatus is operable as or at a relay node in a relay-enhanced access network, wherein said access node is another relay node than said relay node, and/or
the apparatus is operable as or at a femto/home base station, and/or
the apparatus is operable as or at a macro base station, wherein said access node of said cell is a femto/home base stations, or the method is operable at or by a femto/home base stations, wherein said access node is another femto/home base stations than said femto/home base stations, and/or
said access node and/or said apparatus is part of an evolved radio access network in accordance with LTE and/or LTE-Advanced specifications.

15. An apparatus comprising
a processor configured to generate delay information being indicative of an expected packet delay in a cell of a access node in an access network,
wherein the delay information relates to backhaul resources,
wherein the backhaul resources are heterogeneous,
wherein the heterogeneous backhaul resources comprise at least one of the following:
backhaul resources between base stations of different hierarchical level in terms of logical, structural, or both logical and structural network deployment,
backhaul resources between different types of base stations and the network,
backhaul resources differing in technology from the network,
backhaul resources differing in technology from a system using homogeneous backhaul technology,
backhaul resources differing in handover from one another, and
backhaul resources differing in connectivity from one another, where the end-to-end delay characteristics vary depending on the choice of the base station; and
a transmitter configured to transmit the generated delay information towards an apparatus in charge of evaluating the suitability of the access node cell as target for a handover of a terminal and configured to enable or disable the access node cell as target for a handover of the terminal based on the evaluated suitability thereof.

16. The apparatus according to claim 15, wherein
the processor is further configured to measure an actual packet delay in the access node cell and to include corresponding information in the delay information, and/or
the processor is further configured to obtain a resource characteristic and/or a resource usage of the access node cell and to include corresponding information in the delay information, and/or
the processor is further configured to obtain a mobility characteristic of the access node cell and to include corresponding information in the delay information, and/or
the processor is further configured to obtain a multi-hopping characteristic of the access node cell and to include corresponding information in the delay information,
wherein the processor, to obtain the multi-hopping characteristic of the access node cell, may be further configured to
calculate a cumulative delay of the access node cell, including delay information of the access node and any access nodes between the access node of the cell and its controlling access node, and/or
specify a relay depth of the access node, being indicative of a number of relay levels between the access node of the cell and its controlling access node, in case the access node of the cell is a relay node of a relay-enhanced access network.

17. The apparatus according to claim 15, further comprising
a receiver configured to receive a handover request for a handover of the terminal to the access node cell,
wherein the processor is further configured to perform admission control for the handover of the terminal to the access node cell based on the expected packet delay of the access node cell, or to delegate another access node to perform admission control for the handover of the terminal to the access node cell based on the expected packet delay of the access node cell on behalf of said access node.

18. The apparatus according to claim 15, wherein
the apparatus is operable as or at the access node, and/or
said access node is a relay node in a relay-enhanced access network, and/or
said apparatus in charge of evaluating the suitability of the access node is a donor base station controlling one or more relay nodes in a relay-enhanced access network, wherein said access node of said cell is a relay node, or the said apparatus in charge of evaluating the suitability of the access node is operable at or by a relay node in a relay-enhanced access network, wherein said access node is another relay node than such relay node, and/or
said access node is a femto/home base station, and/or
said apparatus in charge of evaluating the suitability of the access node is a macro base station, wherein said access node of said cell is a femto/home base station, or the said apparatus in charge of evaluating the suitability of the access node is operable at or by a femto/home base station, wherein said access node is another femto/home base station than such femto/home base station, and/or said access node and/or said apparatus in charge of evaluating the suitability of the access node and/or said apparatus is part of an evolved radio access network in accordance with LTE and/or LTE-Advanced specifications.

\* \* \* \* \*